United States Patent [19]

Fukushima et al.

[11] Patent Number: 4,884,081
[45] Date of Patent: Nov. 28, 1989

[54] MAGNETIC INK AND METHOD OF PRINTING

[75] Inventors: Hitoshi Fukushima; Katsumori Takei; Kohei Iwamoto; Hiroto Nakamura, all of Nagano, Japan

[73] Assignee: Seiko Epson Corporation, Tokyo, Japan

[21] Appl. No.: 199,482

[22] Filed: May 27, 1988

[30] Foreign Application Priority Data

May 29, 1987 [JP] Japan .................. 62-133871

[51] Int. Cl.4 .......................................... G01D 15/00
[52] U.S. Cl. .................................................. 346/74.6
[58] Field of Search ............. 346/140 RD, 74.6, 74.4, 346/74.2, 76 PH, 105, 151; 400/120; 219/216 PH

[56] References Cited

U.S. PATENT DOCUMENTS 4,396,925  8/1983  Kohashi ............. 346/140 PD
4,758,844  7/1988  Takei et al. ............. 346/74.4

FOREIGN PATENT DOCUMENTS 81173      6/1980  Japan .
55-105579  8/1980  Japan .................. 346/105
96871      6/1982  Japan .
27178      2/1987  Japan .

Primary Examiner—Arthur G. Evans
Attorney, Agent, or Firm—Blum Kaplan

[57] ABSTRACT

A thermal transfer magnetic ink, ink sheet and method of printing with the magnetic ink and apparatus which will print high quality images and characters. The heat-fusible magnetic ink transfer sheet includes a heat-fusible magnetic ink layer disposed on a heat resistant support film. The magnetic ink layer includes minute magnetic particles dispersed in a binder and has a surface tension lower than about 20 dynes/cm when melted. The magnetic properties of the ink combined with the melted ink's surface tension, permit avoiding contact between the ink transfer sheet and the recording medium. A magnetic field pulls the ink melted by a print head off of the support film so that the melted ink flies from the ink transfer sheet to the recording medium.

20 Claims, 3 Drawing Sheets

MAGNETIC INK AND METHOD OF PRINTING

BACKGROUND OF THE INVENTION

This invention relates generally to a magnetic ink for nonimpact printing. More particularly, it relates to an ink containing magnetic particles and surface active agents for an ink transfer sheet. Heat and magnetism are used to transfer the ink to a recording medium during printing.

Several attempts have been made to commercialize a small low-priced non-impact printer which prints with magnetic ink. For example, Japanese laid open application No. 96541/1977 discloses one such method wherein ink is transferred by selectively melting a portion of the ink to be recorded. A magnet attracts magnetic particles dispersed in the ink, thereby enhancing the transfer of ink to the recording medium.

An example of prior art magnetically enhanced ink transfer printing is illustrated in FIG. 3. A magnetic ink transfer sheet 12 including a support film 33 and a magnetic ink layer 34 is positioned intermediate a thermal print head 31 and a recording medium 35. A magnet 36 is disposed on an opposed surface of recording medium 35. To print with the illustrated apparatus, thermal print head 31 contacts support film 33 of magnetic ink transfer sheet 12 as magnetic ink layer 34 of ink transfer sheet 12 contacts recording medium 35. Thermal print head 31 selectively applies heat through support film 33 into ink layer 34 to melt specific portions 34' of ink layer 34. Melted portions 34' adhere to recording medium 35 when ink transfer sheet 12 is stripped from recording medium 35, in the direction of arrow A, after printing. A magnet 36 exerts magnetic force on ink 34 to enhance adherance of printed portions of ink 34' to recording medium 35 when ink transfer sheet 12 is peeled away. Thus, this magnetically enhanced printing method generally yields high quality printing of characters and images.

However, printing with the apparatus shown in FIG. 3 is not without shortcomings. During printing, portion of ink to be transferred 34' contacts both support film 33 and the non-recorded ink of ink layer 34 while ink transfer sheet 12 is peeled off. Therefore, the ink intended to be transferred can unintentionally be peeled off with the non-recorded ink because it adheres to non-recorded ink when ink transfer sheet 12 is peeled off recording medium 35.

In ordinary heat transfer printing, complete ink transfer is only possible when the following relationship is established, as illustrated in FIG. 4:

$$FA \text{ and } FB >> FC \text{ and } FD$$

wherein FA is an adhesive force between an ink portion to be transferred 42 and a recording medium 44; FB is a cohesive force of ink to be transferred 42; FC is an adhesive force between ink to be transferred 42 and support film 41; and FD is a cohesive force between ink to be transferred 42 and ink which remains affixed 43 to support film 41. Forces FC and FD act to retain ink to be transferred 42 to support film 41. Forces FA and FB act to transfer ink 42 to recording medium 44.

The transfer efficiency of the apparatus illustrated in FIG. 3 is somewhat increased by magnetic assistance. By magnetically pressing molten ink 34 onto recording medium 35, FA is increased. However, increasing FA does not decrease FC or FD because support film 33, ink 34 and transfer medium 35 are all contacting each other when ink transfer sheet 12 is peeled off recording medium 35. Further, if recording medium 35 has a rough surface, FA will decrease. Because the addition of magnetism does not affect FC or FD, a transfer medium having a rough surface tends to create the situation in which FA is less than FC or FA is less than FD. This could lead to incomplete ink transfer.

Another disadvantage of prior art thermal or magnetically assisted thermal printing is that the dots of ink (pixels) have abnormal shape if a recording medium 52 has a rough surface, as shown in FIG. 5. If recording medium 52 has a rough surface, the surface will have a plurality of recesses 54 and projecting bumps 56. Because contact ink layer 53 does not contact recesses 52, force FA is equal to 0 opposite recesses 54. Frequently, ink will not be transferred to recess 54, but instead, ink will clump at projecting bumps 56. Further, when printing on an extremely rough recording medium (having a Bekk smoothness of about one or two seconds) the magnetic force attracting ink 53 into recording medium 52 is not as effective in sufficiently increasing FA as when printing onto a smooth recording medium. As illustrated in FIG. 6, magnetic ink will only adhere to the surface fibers of a projecting portion 61 to form a recorded dot 62 of irregular shape.

Another defect in conventional magnetic ink printing occurs when magnetic ink layer 34 contacts recording medium 35 during printing. Recording medium 35 acts as a heat sink and absorbs a large portion of the heat generated by thermal print head 31. This phenomenon is referred to as "heat loss". Because of the heat absorbed by recording medium 35, print head 31 must generate considerable heat to melt recorded portions of ink layer 34 to make up for the heat lost to recording medium 35.

By printing with thermal head 31, ink transfer sheet 12 and transfer medium 31 all in contact with each other, friction and heat conduction occurrs between magnetic ink 34 and recording medium 35. This causes heat to build up in magnetic ink layer 34, melting portions of ink layer 34 which were not intended to be transferred. This unintentional transfer of ink is referred to as "greasing".

Conventional magnetic ink includes pigment and fine inorganic magnetic powder dispersed in a binder. The binder frequently includes waxes, thermoplastic resin, dispersing agents, oils, fats and low molecular weight organic substances. Printing with conventional magnetic ink can result in poor transfer efficiency, poor dot reproduceability and irregularly shaped printed dots. Accordingly, the print quality is poor. These defects are intensified when print density is high, i.e., printing a large number of minute dots in a small area.

Accordingly, it is desirable to provide an improved ink composition which overcomes these defficiencies in the prior art.

SUMMARY OF THE INVENTION

Generally speaking, in accordance with the invention, a thermal transfer magnetic ink and method of printing with the magnetic ink are provided for printing high quality images and characters. Printing is performed with an ink transfer sheet formed of a heat fusible magnetic ink layer disposed on a heat resistant support film. The magnetic ink layer includes minute magnetic particles dispersed in a binder and has a surface tension lower than 20 dynes/cm when melted. When printing with this improved magnetic ink, it is possible to avoid contact between the ink transfer sheet and the recording medium. Because of the magnetic properties of the ink combined with the melted ink's surface tension, a properly directed magnetic field pulls the ink melted by a print head off of the support film, so that in effect, the ink flies from the ink transfer sheet to the recording medium.

Accordingly, it is an object of this invention to provide an improved magnetic ink and printing method.

Another object of the invention is to provide an improved magnetic ink and printing method capable of forming uniform images of high pixel density on a recording medium having a rough surface.

A further object of the invention is to provide an improved magnetic ink and printing method which reduces the occurence of heat loss and greasing.

Still another object of the invention is to provide an improved magnetic ink and printing method capable of printing dots of regular shape on rough surfaces and on recording media having a low affinity for ink.

Still other objects and advantages of the invention will in part be obvious and will in part be apparent from the specification and drawings.

The invention accordingly comprises the several steps and the relation of one or more of such steps with respect to each of the others, and the article possessing the characteristics, properties, and the relation of constituents which will be exemplified in the following detailed disclosure, and the scope of the invention will be indicated in the claims.

BRIEF DESCRIPTION OF THE DRAWING

For a fuller understanding of the invention, references had to the following description taken in connection with the accompanying drawing which.

DESCRIPTION OF THE PREFERRED EMBODIMENTS

Figure 2:
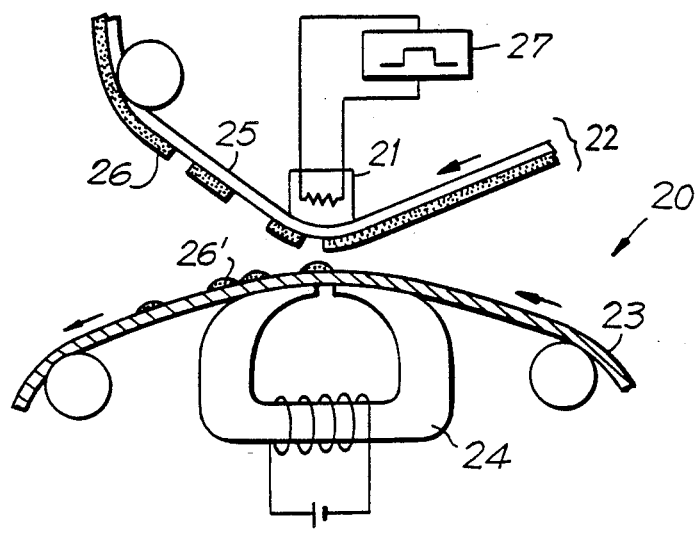
FIG. 2 is a diagrammatic view of a magnetic ink printing apparatus constructed in accordance with a preferred embodiment of the invention.
Figure 3:
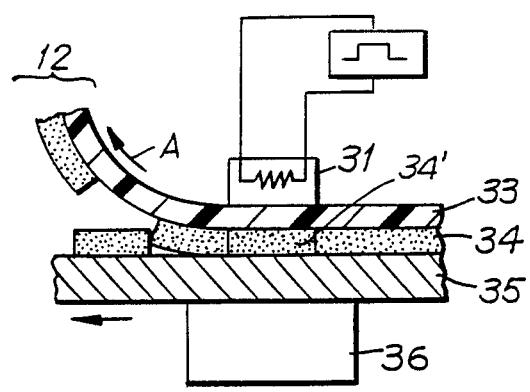
FIG. 3 is a diagrammatic view of a prior art magnetic thermal printing apparatus.
Figure 4:
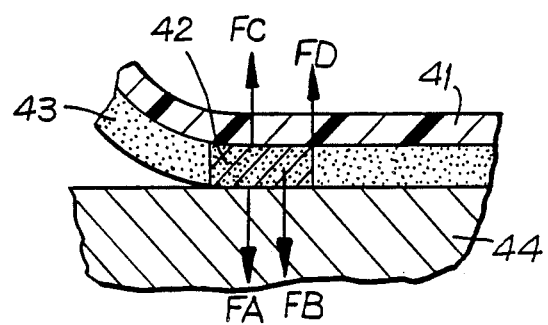
FIG. 4 is a view illustrating the different forces present during thermal printing.
Figure 5:
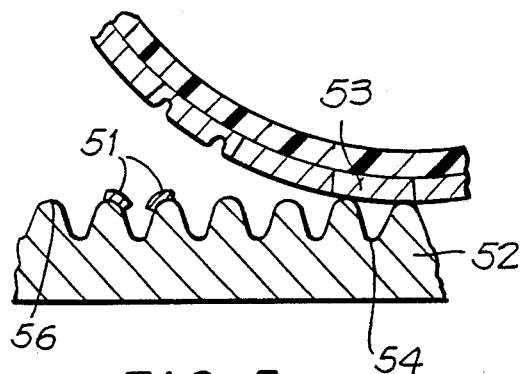
FIG. 5 is a sectional view illustrating problems encountered during conventional printing onto a rough recording medium.
Figure 6:
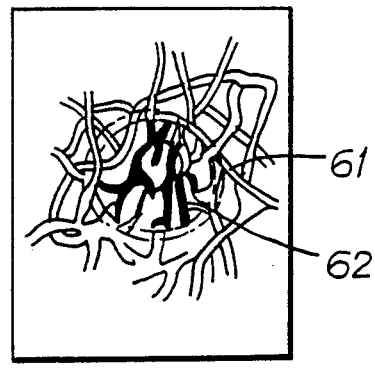
FIG. 6 is a diagrammatic view illustrating a dot of ink printed on a rough surface transfer medium by a conventional printing method.

Referring generally to FIG. 2, an ink transfer sheet 22 including a thermo-fusible magnetic ink layer 26 prepared in accordance with the invention, is shown incorporated within an apparatus 20 for magnetic thermal transfer printing by a method in accordance with the invention.

Ink transfer sheet 22 is formed of magnetic ink layer 26 disposed on a support film 25 which acts as a carrier for ink layer 26. Support film 25 must be heat resistant and have sufficient tensile strength to remain intact during printing. Acceptable materials for forming support film 25 include synthetic resins such as polyethylene, polypropylene, polystyrene, polyimide, polyethersulfone and polyethylene terephthalate (PET). Support film 25 can be about 1 to 30 μm thick but more preferably it should be about 1 to 10 μm thick.

Magnetic ink layer 26 is supported by support film 25 until portions of ink layer 26, intended for printing, are transferred to a recording medium 23. Magnetic ink layer 26 includes fine magnetic particles and surface tension affecting agents, included within a thermo-fusible binder. The binder must be both solid and fluid at appropriate temperatures and disperse additives well. Acceptable binders include paraffin wax, microcrystalline wax, carnuba wax, oxidized wax, polyethylene wax, -olefin anhydride copolymer, fatty acid amide, fatty acid ester and distearylketone. These substances can be used individually or in combination.

The magnetic particles dispersed in ink layer 26 give the ink its magnetic qualities. It is beneficial to add effective amounts of dispersing agents such as dioctyl succinate α-sodium sulfonate to the wax. Effective amounts can include less than 1 wt.% or more, depending on the dispersing agent included.

A great variety of particles having magnetic qualities can be included within ink layer 26. Acceptable magnetic additives include fine particles of magnetite, manganese-zinc ferrite, manganese ferrite, nickel-zinc ferrite, garnet, ferrosoferric oxide, metals, and alloys included individually or in combination. The diameter of these particles should be about between 10 to 20,0000 Å. More preferably, the range should be about between 500 to 15,000 Å.

The surface tension of magnetic ink has a large affect on the quality of the printing which can be achieved with the ink. Accordingly, it is desireable to add components to magnetic ink which have a beneficial effect on the surface tension of the ink. Examples of additives which will affect surface tension include ionic surface active agents such as alkyl sulfate, polyoxyethylene-alkylether sulfate, dialkyl succinate α-sodium sulfonate, mono-long chainalkyltridimethyl ammonium choloride, amine salts of fatty acids, benzenesulfonate and alkyldimethylammonium betaine; and nonionic surface active agents such as polytetraflouroethylene, polyvinylidene flouride, hexa-fluoropropylene, dimethyl polysiloxane, methylhydrogen polysiloxane, polyoxyethylene alkylether, polyoxyethylene-polyoxypropylene block copolymer, polyethylene-polytetrafluoroethylene mixture (polyfluorowax, sold as polyfluoro-150 by Micropowder Co.), polydimethyl siloxane-polyoxyalkylene copolymer and polyoxyethylene dodecylphenylether. By adding effective amounts of these or other surface tension affecting agents, alone or in combination, the surface tension of melted magnetic ink can be controlled to within desired limits.

The surface tension of the molten magnetic ink varies with the temperature of the ink. Generally, higher tempertures yield molten inks with lower surface tension. Therefore, the value of the surface tension of the molten ink must be associated with a specific temperature. To standardize the discussion of surface tension values herein, values given for surface tension will be for the surface tension of the molten ink at 120° C.

The quality of the transferred dot of ink varies with the surface tension of the molten magnetic ink because magnetic ink having a high surface tension is not transferred easily. When the surface tension of the molten ink is greater than about 20 dynes/cm, the transferred dots of ink are irregularly sized. Accordingly, the dot reproduceability and printing quality is poor. In contrast, ink having a surface tension of less than 20 dynes/cm and preferably between about 5.0 to 18 dynes/cm, and most preferably about between 13.5 to 17 dynes/cm will lead to greatly improved print quality.

The resolving power of transferred dots of ink also depends on the resolving power of the heating element of the thermal print head. The highest resolving power presently available is 480 dpi (19 dots/mm). Typical printer resolving powers are 400 dpi (16 dots/mm) 360 DPI (14 dots/mm) and 300 DPI (12 dots/mm). A high quality ink and printing method are needed to fully realize the benefits of such high resolution print heads.

A method of printing in accordance with the invention is discussed generally below with reference to the apparatus illustrated in FIG. 2. Characters and images are printed on recording medium 23 when thermal print head 21 heats selected portions of magnetic ink layer 26 in response to recording signals from a printer control circuit 27 which heats print head 21. This heating lowers the surface tension of the ink to be recorded to below 20 dynes/cm. At this surface tension, the melted ink can be pulled onto and retained on recording medium 23 by an electromagnet 24 exerting an attractive force of about 1.0 dyne.

As shown in FIG. 2, ink transfer sheet 22 and ink from ink layer 26 do not contact recording medium 23, except for dots of ink 26' that are intentionally transferred to recording medium 23. When a selected portion of ink layer 26' melts, the cohesive force with non-melted ink 26 and the adhesive force with support film 25 is greatly reduced. Accordingly, a magnetic force of, for example, about 1.0 dyne will cause a melted dot of ink 26' to fly from magnetic ink transfer sheet 22 onto recording medium 23. Because ink transfer sheet 22 does not contact recording medium 23, the problems of heat loss and greasing are eliminated. Because transferred ink dots 26' on recording medium 23 do not contact non-recorded ink 26, FC and FD are equal to 0 after the ink is transferred.

The invention will now be explained in greater detail in the following examples. The examples are presented for purposes of illustration only, and are not intended to be construed in a limiting sense.

EXAMPLES 1-3

Figure 1:
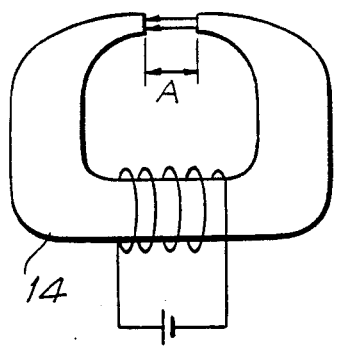
FIG. 1 is a diagrammatic view of an electromagnet constructed in accordance with a preferred embodiment of the invention.

A printer similar to apparatus 20 illustrated in FIG. 2 was used to print dots 26' on a recording medium 23. Magnet 24 employed in the example was similar to a magnet 14 shown in FIG. 1. Magnet 14 has a core made of Permendure (Co 50) and produces a magnetomotive force (NI) of 3,000 AT. A gap A formed in magnet 14 is 400 μm wide. Thermal head 21 is a thin film type (0.8 mJ/dot) thermal head having a resolving power of 180 dpi. Ink transfer sheet 22 used to print dots 26' includes ink layer 26 on support film 25. Support film 25 was a 4 μm thick PET film. Ink layer 26 was a 6 μm thick layer of magnetic ink formed on support film 25 by hot melt coating. The composition of the magnetic inks tested in each example are listed in Table 1 below.

TABLE 1

| Example No. | $Fe_3O_4$ fine particles 0.2 μm in diameter (wt %) | 0.5 μm in diameter (wt %) | Dispersing agent Dioctyl succinate α-sodium sulfonate (wt %) | Surface tension depressant Polyfluorowax* (wt %) | Binder Paraffin wax (wt %) |
|---|---|---|---|---|---|
| 1-1 | 30 | 20 | 0.9 | 0.1 | 49 |
| 1-2 | 30 | 20 | 0.9 | 0.3 | 48.8 |
| 1-3 | 30 | 20 | 0.9 | 0.4 | 48.7 |
| 1-4 | 30 | 20 | 0.9 | 0.5 | 48.6 |
| 1-5 | 30 | 20 | 0.9 | 0.7 | 48.4 |
| 1-6 | 30 | 20 | 0.9 | 0.8 | 48.3 |
| 1-7 | 30 | 20 | 0.9 | 1.0 | 48.1 |
| (1-1) | 30 | 20 | 0.9 | 0 | 49.1 |
| | | | Dioctyl succinate α-sodium sulfonate | Polydimethyl Siloxane-polyoxyalkylene copolymer | Paraffin wax |
| 2-1 | 30 | 30 | 0.7 | 0.5 | 38.8 |
| 2-2 | 30 | 30 | 0.7 | 0.7 | 38.6 |
| 2-3 | 30 | 30 | 0.7 | 1.0 | 38.3 |
| (2-1) | 30 | 30 | 0.7 | 0.01 | 39.99 |
| | | | Dioctyl succinate α-sodium sulfonate | Polyoxyethylene-pelyoxy-propylene block copolymer | Microcrystalline wax |
| 3-1 | 10 | 40 | 0.5 | 0.1 | 49.4 |
| 3-2 | 10 | 40 | 0.5 | 0.8 | 48.7 |
| 3-3 | 10 | 40 | 0.5 | 1.0 | 48.5 |
| (3-1) | 10 | 40 | 0.5 | 0.05 | 49.95 |

*Trade name: polyFluoro-150 (made by Micropowder Co., Ltd.) Parenthisized numbers indicate Comparative Examples.

TABLE 2

| Example No. | Surface tension (dyn/cm) | Transfer efficiency(%) | Dot reproducibility* | Overall rating** |
|---|---|---|---|---|
| 1-1 | 19.5 | 80 | fair | fair |
| 1-2 | 17.5 | 84 | fair | fair |
| 1-3 | 16.8 | 88 | good | good |
| 1-4 | 16.0 | 90 | good | good |
| 1-5 | 15.3 | 93 | good | good |
| 1-6 | 14.7 | 98 | good | good |
| 1-7 | 14.1 | 98 | good | good |
| (1-1) | 24.3 | 55 | poor | poor |
| 2-1 | 15.0 | 92 | good | good |
| 2-2 | 14.7 | 96 | good | good |
| 2-3 | 13.9 | 97 | good | good |
| (2-1) | 25 | 48 | poor | poor |
| 3-1 | 19.7 | 82 | fair | fair |

TABLE 2-continued

| Example No. | Surface tension (dyn/cm) | Transfer efficiency(%) | Dot reproducibility* | Overall rating** |
|---|---|---|---|---|
| 3-2 | 14.3 | 97 | good | good |
| 3-3 | 14.0 | 98 | good | good |
| (3-1) | 21.5 | 67 | poor | poor |

Parenthisized numbers indicate Comparative Examples.
Remarks:*
good: Completely round dot
fair: Missing parts on the periphery
poor: Missing parts on the periphery and inside.
Remarks:**
good: Dot reproducibility is good and transfer efficiency is higher than 90%.
fair: Dot reproducibility is good and transfer efficiency is lower than 90% or dot reproducibility is fair.
poor: Dot reproducibility is poor.

In accordance with the invention, magnetic thermal transfer printing was accomplished using the previously discussed ink, apparatus and method, on paper having a Bekk smoothness of 2 seconds. The results are summarized in Table 2 above. The best results occurred with inks having a surface tension in the range of 16.8 to 13.9 dynes/cm. Dye can be added to the ink without affecting the results. The compositions of ink listed in Table 1 can be modified by replacing a portion of the wax with enough Leuco dye (Mitsui Toatsu Chemical Co., Ltd.) to make up about 2 to 4% by weight of the ink layer.

The magnetic ink used in connection with a magnetic ink transfer sheet and method of printing according to the invention satisfy the objects of the invention and eliminate defects found in the prior art. Clear images can even be formed on recording media having rough surfaces and also on recording media having poor affinity for ink.

It will thus be seen that the objects set forth above, among those made apparent from the preceding description are efficiently attained and, since certain changes may be made in carrying out the above method and in the articles set forth without departing from the spirit and scope of the invention, it is intended that all matter contained in the above description and shown in the accompanying drawings shall be interpreted as illustrative and not in a limiting sense.

It is also understood that the following claims are intended to cover all of the generic and specific features of the invention herein described and all statements of the scope of the invention which, as a matter of language might be said to fall therebetween.

Particularly it is to be understood that in said claims, ingredients or compounds recited in the singular are intended to include compatible mixtures of the ingredient whereever the sense permits.

What is claimed is:

1. A heat-fusible magnetic ink, comprising:
   a heat-fusible binder including magnetic particles dispersed in the binder; and
   an effective amount of surface tension control material dispersed in the binder for lowering the surface tension of the ink in its molten state to less than about 20 dynes/cm.

2. The heat-fusible magnetic ink of claim 1, wherein the surface tension control material is at least one surface active agent.

3. The heat-fusible magnetic ink of claim 2 wherein the surface active agent is selected from the group of ionic and non-ionic surface active agents.

4. The heat-fusible magnetic ink of claim 2, wherein the surface active agent is at least one surface active agent selected from the group consisting of alkyl sulfate, polyoxyethylenealkylether sulfate, dialkyl succinate α-sodium sulfonate, monolong chain-alkyltridimethyl ammonium choloride, amine salts of fatty acids, benzenesulfonate, alkyldimethylammonium betaine, polytetraflouroethylene, polyvinylidene flouride, hexa-fluoropropylene, dimethyl polysiloxane, methylhydrogen polysiloxane, polyoxyethylene alkylether, polyoxyethylene-polyoxypropylene block copolymer, polyoxyethylene dodecylphenylether, polyethylene-polytetrafluoroethylene copolymer, polydimethyl siloxane-polyoxyalkylene copolymer and mixtures thereof.

5. The heat-fusible magnetic ink of claim 1, wherein the surface tension control material includes a surface tension control substance selected from the group consisting of dioctyl succinate α-sodium sulfonate, polydimethyl siloxane-polyoxyalkylene copolymer, polyethylene-polytetrafluoroethylene copolymer mixture and polyoxyethylene-polyoxypropylene block copolymer and combinations thereof.

6. The heat-fusible magnetic ink of claim 1, wherein the surface tension of the molten ink is between about 5.0 to 18 dynes/cm.

7. The heat-fusible magnetic ink of claim 1, wherein the surface tension of the molten ink is between about 13.5 to 17 dynes/cm.

8. The heat-fusible magnetic ink of claim 1, wherein the magnetic particles are selected from the group consisting of magnetite, manganese ferrite, nickel-zinc ferrite, garnet, ferrosoferric oxide, metals and alloys and combinations thereof.

9. The heat-fusible magnetic ink of claim 1, wherein the diameter of the magnetic particles is between about 10 to 20,000 Å.

10. The heat-fusible magnetic ink of claim 1, wherein the diameter of the magnetic particles is between about 500 to 15,000 Å.

11. The heat-fusible magnetic ink of claim 8, wherein the diameter of the magnetic particles is between about 500 to 15,000 Å.

12. A heat-fusible magnetic ink sheet, comprising:
    a support film;
    a heat-fusible magnetic ink layer disposed on the support film, the ink layer including a heat-fusible binder having magnetic particles dispersed therein and an effective amount of at least one surface tension control material dispersed therein to provide ink having a surface tension less than about 20 dynes/cm in the molten state.

13. The heat-fusible magnetic ink sheet of claim 12, wherein the support film is formed of a synthetic resin.

14. The heat-fusible magnetic ink sheet of claim 12, wherein the ink layer is between about 1 to 30 μm in thickness.

15. The heat-fusible magnetic ink sheet of claim 12, wherein the heat-fusible binder is selected from the group consisting of paraffin wax, microcrystalline wax, carnuba wax, oxidized wax, α-olefin-maleic anhydride copolymer, fatty acid amide, fatty acid ester, distearylketone and mixtures thereof.

16. The heat-fusible magnetic ink sheet of claim 12, wherein the surface tension control material is selected from the group of ionic and non-ionic surface active agents.

17. A method of thermal transfer printing, comprising:

placing a heat-fusible magnetic ink sheet including a heat-fusible magnetic ink layer including magnetic particles and an effective amount of surface tension control material dispersed in a heat-fusible binder with a surface tension in the molten state of less than about Z20 dynes/cm in contact with a thermal print heat and opposed to a recording medium, selectively melting a portion of the ink layer; and subjecting the selected melted ink portion to a magnetic field to force the melted ink onto the recording medium.

18. The method of thermal transfer printing of claim 17, wherein the ink transfer sheet is spaced apart from the recording medium.

19. The method of thermal transfer printing of claim 18, wherein the recording medium is displaced over an electromagnet at the print position opposed to the ink transfer sheet during melting of the ink layer.

20. The method of thermal transfer printing of claim 18, including applying a magnetic attraction force of between 0.5 to 2.0 dynes.

* * * * *

UNITED STATES PATENT AND TRADEMARK OFFICE
CERTIFICATE OF CORRECTION

PATENT NO. : 4,884,081

DATED : November 20, 1989

INVENTOR(S) : Hitoshi Fukushima et al.

It is certified that error appears in the above-identified patent and that said Letters Patent is hereby corrected as shown below:

At column 9, line 6, "Z20" should read --20--.

Signed and Sealed this

Twenty-third Day of October, 1990

Attest:

*Attesting Officer*

HARRY F. MANBECK, JR.

*Commissioner of Patents and Trademarks*